United States Patent
Sardes et al.

(10) Patent No.: US 11,364,757 B2
(45) Date of Patent: Jun. 21, 2022

(54) DEVICE AND METHOD FOR DOUBLE-ARM SUSPENSION AND IN-WHEEL STEERING

(71) Applicant: REE AUTOMOTIVE LTD, Tel Aviv (IL)

(72) Inventors: Ahishay Sardes, Tel Aviv (IL); Ran Dekel, Nofit (IL); Tomer Segev, Tel-Aviv (IL); Eran Starik, Tel Aviv-Jaffa (IL); Amit Aknin, Karkom (IL); Eylon Avigur, Ramat-Gan (IL)

(73) Assignee: REE AUTOMOTIVE LTD, Kibbutz Galil-Yam (IL)

( * ) Notice: Subject to any disclaimer, the term of this patent is extended or adjusted under 35 U.S.C. 154(b) by 0 days.

(21) Appl. No.: 17/054,942

(22) PCT Filed: Jun. 28, 2020

(86) PCT No.: PCT/IL2020/050720
§ 371 (c)(1),
(2) Date: Nov. 12, 2020

(87) PCT Pub. No.: WO2020/261284
PCT Pub. Date: Dec. 30, 2020

(65) Prior Publication Data
US 2021/0245561 A1    Aug. 12, 2021

Related U.S. Application Data

(60) Provisional application No. 62/867,901, filed on Jun. 28, 2019.

(51) Int. Cl.
*B60G 3/20* (2006.01)
*B60G 13/00* (2006.01)

(52) U.S. Cl.
CPC ............. *B60G 3/20* (2013.01); *B60G 13/005* (2013.01); *B60G 2200/144* (2013.01); *B60G 2204/129* (2013.01); *B60G 2204/148* (2013.01)

(58) Field of Classification Search
CPC .. B60G 3/20; B60G 13/005; B60G 2204/129; B60G 2204/148; B60G 2200/144
See application file for complete search history.

(56) References Cited

U.S. PATENT DOCUMENTS 2,670,200 A * 2/1954 Seddon .................. B60G 11/22
267/293
3,037,762 A * 6/1962 Axtmann ................. B60G 7/04
267/188

(Continued)

FOREIGN PATENT DOCUMENTS

DE    102013013324    2/2015
FR    2698825         6/1994

(Continued)

OTHER PUBLICATIONS

International Search Report for PCT application No. PCT/IL2021/0500098 dated May 9, 2021.

*Primary Examiner* — Paul N Dickson
*Assistant Examiner* — Timothy Wilhelm
(74) *Attorney, Agent, or Firm* — Pearl Cohen Zedek Latzer Baratz LLP

(57) ABSTRACT

A suspension system for a wheel of a vehicle including: a wheel interface having a wheel interface axis which is an axis about which a wheel rotates when connected to the wheel interface; a first arm connected to the wheel interface and rotatable with respect to the wheel interface about a first axis that is substantially parallel to the wheel interface axis; and a second arm connected to the wheel interface and rotatable with respect to the wheel interface about a second axis that is substantially parallel to the wheel interface axis; and a damping and springing means disposed within a gap formed between the first arm and the second arm, the damping and springing means are connected at one of its ends to at least one of the first arm, the second arm and the (Continued)

wheel interface; wherein at least a portion of the suspension system is to be disposed within a rim of a wheel.

24 Claims, 9 Drawing Sheets

(56) References Cited

U.S. PATENT DOCUMENTS

| | | | |
|---|---|---|---|
| 3,174,771 A | 3/1965 | Miller | |
| 3,578,354 A | 5/1971 | Schott | |
| 4,726,603 A * | 2/1988 | Sugiyama | B60G 7/006 280/5.522 |
| 4,752,079 A * | 6/1988 | Fahrner | B60B 9/26 152/208 |
| 4,834,408 A * | 5/1989 | de Cortanze | B60G 3/207 180/219 |
| 4,973,070 A * | 11/1990 | Menichini | B60G 3/205 280/5.521 |
| 5,087,229 A * | 2/1992 | Hewko | B60K 7/0007 180/65.51 |
| 5,150,763 A * | 9/1992 | Yamashita | B60K 7/0007 180/242 |
| 5,156,414 A * | 10/1992 | Fayard | G01B 5/24 280/86.75 |
| 5,161,813 A * | 11/1992 | Yamashita | B60G 3/00 180/253 |
| 5,700,025 A * | 12/1997 | Lee | B60G 3/265 280/124.135 |
| 5,938,219 A * | 8/1999 | Hayami | B60G 3/20 280/124.135 |
| 6,347,802 B1 * | 2/2002 | Mackle | B60G 3/265 280/5.52 |
| 6,386,553 B2 * | 5/2002 | Zetterstrom | B60G 3/20 180/413 |
| 6,688,620 B2 * | 2/2004 | Serra | B60G 3/265 280/124.135 |
| 6,776,425 B2 * | 8/2004 | Britton | B62D 13/06 280/103 |
| 6,974,138 B2 * | 12/2005 | Perello | B60G 3/01 180/402 |
| 7,222,863 B2 * | 5/2007 | Deal | B60G 3/01 280/124.135 |
| 7,537,071 B2 * | 5/2009 | Kamiya | B60G 3/20 180/298 |
| 7,537,223 B2 * | 5/2009 | Zetterstroem | B60G 3/265 280/5.52 |
| 7,644,938 B2 * | 1/2010 | Yamada | B60G 7/008 280/86.758 |
| 7,699,326 B2 | 4/2010 | Yamada | |
| 7,703,565 B2 * | 4/2010 | Ikenoya | B60K 17/356 180/65.51 |
| 7,712,748 B2 * | 5/2010 | Deal | B60G 3/01 280/5.521 |
| 7,766,345 B2 * | 8/2010 | Hakui | B60G 7/006 280/5.521 |
| 7,770,677 B2 * | 8/2010 | Takenaka | B60G 3/185 180/65.51 |
| 7,793,946 B2 * | 9/2010 | Vaxelaire | B60G 3/26 280/5.521 |
| 7,862,057 B2 * | 1/2011 | Hilmann | B60G 13/006 280/93.511 |
| 7,958,959 B2 * | 6/2011 | Yogo | B60K 7/0007 180/65.51 |
| 7,988,158 B2 * | 8/2011 | Liu | B60G 3/26 280/5.521 |
| 7,997,596 B2 * | 8/2011 | Yuta | B62D 17/00 280/86.758 |
| 8,050,819 B2 * | 11/2011 | Suyama | B60W 40/10 701/37 |
| 8,083,245 B2 * | 12/2011 | Hatzikakidis | B60G 3/12 280/124.128 |
| 8,152,184 B2 * | 4/2012 | Kuttner | B60G 3/185 280/124.128 |
| 8,152,185 B2 * | 4/2012 | Siebeneick | B60G 7/008 280/124.134 |
| 8,162,332 B2 * | 4/2012 | Michel | B62D 17/00 280/86.751 |
| 8,215,653 B2 * | 7/2012 | Siebeneick | B60G 7/008 280/93.512 |
| 8,322,729 B2 * | 12/2012 | Michel | B62D 17/00 280/5.52 |
| 8,424,880 B2 * | 4/2013 | Horiguchi | B60G 7/008 280/5.521 |
| 8,463,506 B2 * | 6/2013 | Yanagi | B62D 5/046 701/49 |
| 8,500,133 B2 * | 8/2013 | Michel | B60G 7/006 280/5.52 |
| 8,690,177 B2 * | 4/2014 | Buchwitz | G06F 16/245 280/124.135 |
| 8,714,574 B2 * | 5/2014 | Glanzer | B60G 3/202 280/124.136 |
| 8,894,077 B2 * | 11/2014 | Michel | B60G 7/006 280/86.754 |
| 8,910,952 B2 * | 12/2014 | Yoo | B60G 7/006 280/5.522 |
| 8,943,916 B2 * | 2/2015 | Osterlaenger | B60G 7/006 74/89.39 |
| 8,985,610 B2 * | 3/2015 | Juan | B60G 3/185 280/285 |
| 9,187,126 B2 * | 11/2015 | Kawauchi | B62D 7/146 |
| 9,333,824 B2 * | 5/2016 | Zandbergen | B62D 17/00 |
| 9,359,007 B2 * | 6/2016 | Lee | B62D 7/163 |
| 9,446,642 B2 * | 9/2016 | Stenzenberger | B60G 11/14 |
| 9,457,634 B2 * | 10/2016 | Hansen | B60G 7/001 |
| 9,643,643 B2 * | 5/2017 | Fujita | B62D 7/146 |
| 9,821,835 B2 * | 11/2017 | Ferrer-Dalmau Nieto | B62D 5/0418 |
| 10,112,649 B2 * | 10/2018 | Rogers | B60G 3/26 |
| 10,160,486 B2 * | 12/2018 | Kim | B62D 7/14 |
| 10,173,463 B2 | 1/2019 | Barel et al. | |
| 10,351,173 B2 * | 7/2019 | Schmid | B62D 17/00 |
| 10,668,950 B2 * | 6/2020 | Kurita | F16C 19/50 |
| 10,717,333 B2 * | 7/2020 | Mori | B62D 9/00 |
| 10,723,191 B1 * | 7/2020 | Sardes | B60G 3/22 |
| 10,806,106 B2 * | 10/2020 | Olson | A01G 25/09 |
| 10,843,516 B2 * | 11/2020 | Becker | B60G 3/20 |
| 10,946,706 B2 * | 3/2021 | Sardes | B60G 3/207 |
| 10,988,177 B2 * | 4/2021 | Rogers | B60G 3/26 |
| 11,021,027 B2 * | 6/2021 | Sardes | B60G 3/22 |
| 11,046,134 B2 * | 6/2021 | Raffaelli | B62K 5/10 |
| 2001/0035623 A1 * | 11/2001 | Wagner | B60G 7/02 280/124.128 |
| 2002/0036385 A1 * | 3/2002 | Mackle | B60G 3/265 280/5.521 |
| 2005/0017472 A1 * | 1/2005 | Kondo | B62D 7/18 280/93.513 |
| 2005/0051976 A1 * | 3/2005 | Blondelet | B60G 17/0162 280/5.521 |
| 2005/0280241 A1 * | 12/2005 | Bordini | B62D 9/00 280/124.135 |
| 2006/0012144 A1 | 1/2006 | Kunzler et al. | |
| 2006/0033301 A1 * | 2/2006 | Roos | B60G 7/02 280/124.125 |
| 2008/0036168 A1 * | 2/2008 | Wagner | B60G 7/008 280/124.138 |
| 2008/0185807 A1 * | 8/2008 | Takenaka | B60G 3/14 280/124.153 |
| 2009/0224501 A1 * | 9/2009 | Carlson | B60G 9/02 280/124.1 |
| 2010/0052289 A1 * | 3/2010 | Frey | B62D 13/04 280/442 |
| 2010/0276904 A1 * | 11/2010 | Pavuk | B60G 3/202 280/124.135 |
| 2011/0095502 A1 * | 4/2011 | Dada | B60G 3/26 280/124.127 |
| 2011/0193302 A1 * | 8/2011 | Horiguchi | B60G 21/007 280/5.521 |

(56) References Cited

U.S. PATENT DOCUMENTS

| | | | | |
|---|---|---|---|---|
| 2011/0260422 A1* | 10/2011 | Kuttner | ............... | B60G 3/185 |
| | | | | 280/124.113 |
| 2012/0175857 A1* | 7/2012 | Mathis | ............... | B60G 3/20 |
| | | | | 280/124.113 |
| 2014/0251710 A1 | 9/2014 | Juan | | |
| 2014/0300037 A1 | 10/2014 | Winshtein et al. | | |
| 2015/0191064 A1* | 7/2015 | Gielisch | ............... | B60G 3/145 |
| | | | | 280/124.129 |
| 2015/0217618 A1* | 8/2015 | Dorrestijn | ............... | B62D 7/146 |
| | | | | 280/5.52 |
| 2017/0210435 A1* | 7/2017 | Lykken | ............... | A01B 76/00 |
| 2018/0072120 A1 | 3/2018 | Hunter et al. | | |
| 2019/0315171 A1* | 10/2019 | Wolf-Monheim | ..... | B60G 21/05 |

FOREIGN PATENT DOCUMENTS

| | | |
|---|---|---|
| GB | 1393187 | 5/1975 |
| JP | 2017001417 | 1/2017 |
| WO | WO 2011/133258 | 10/2011 |

\* cited by examiner

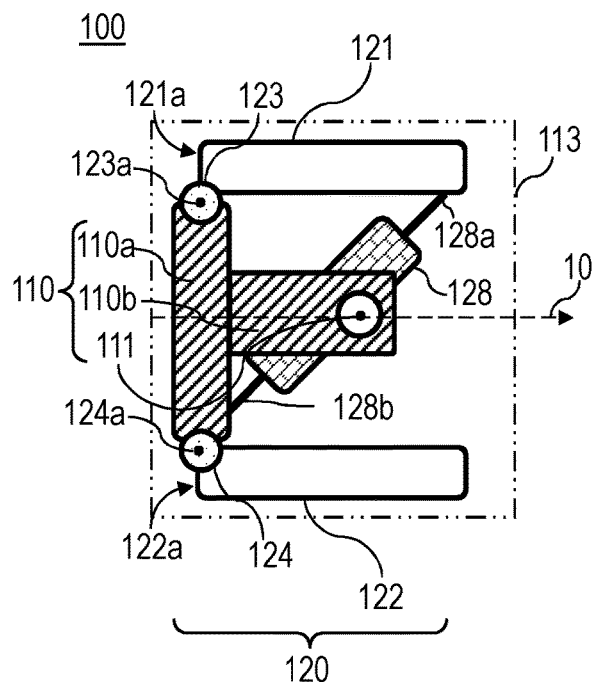
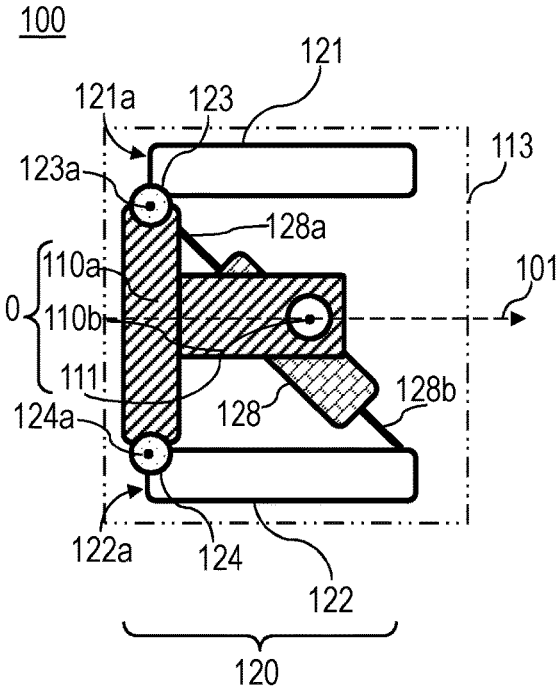
Fig. 1D  Fig. 1E
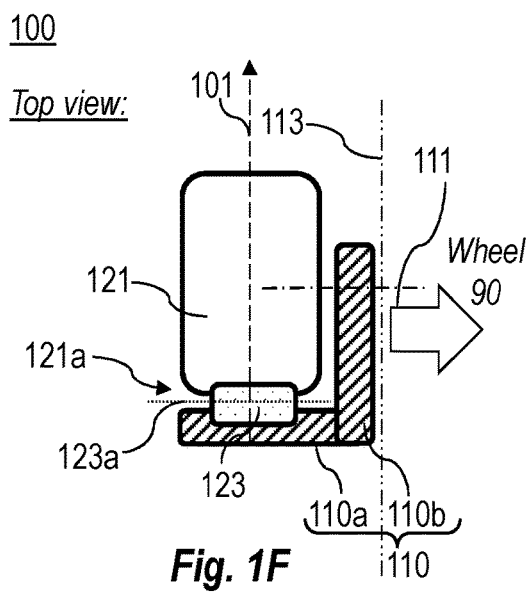
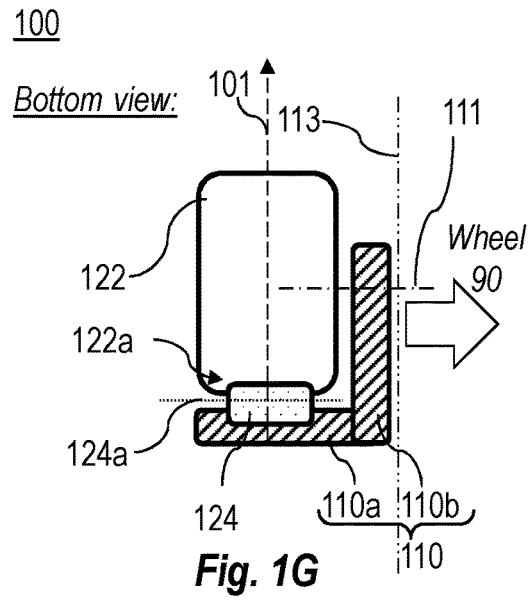
Fig. 1F  Fig. 1G

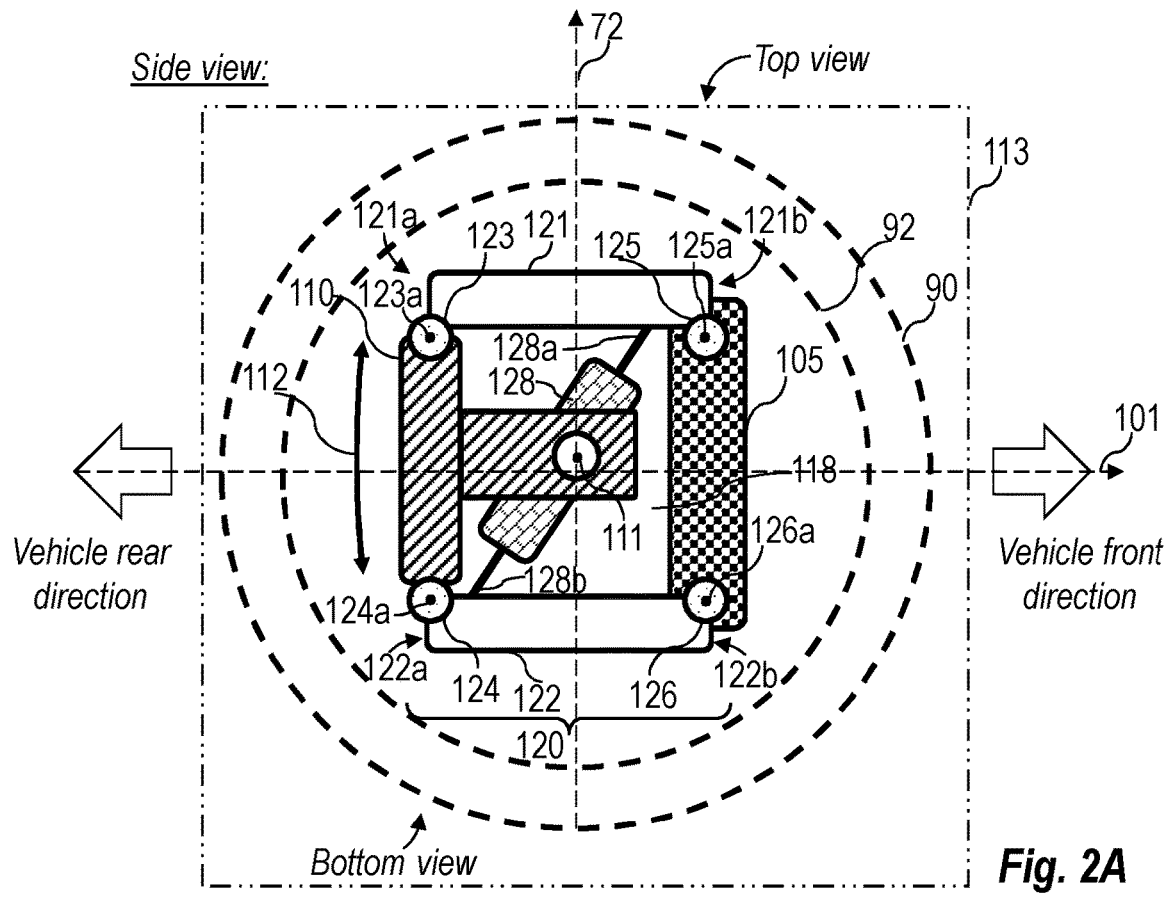
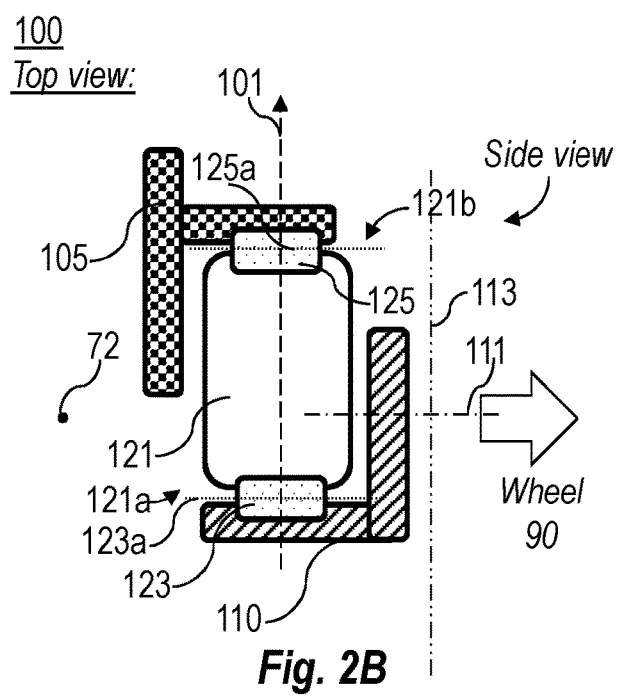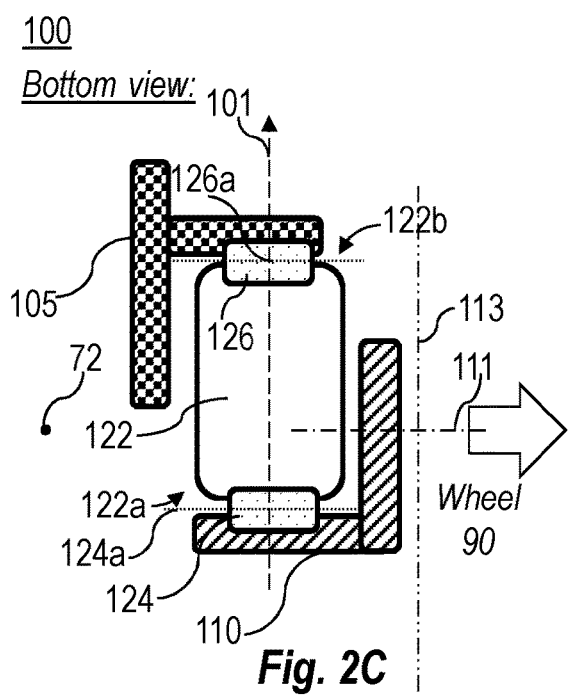

US 11,364,757 B2

DEVICE AND METHOD FOR DOUBLE-ARM SUSPENSION AND IN-WHEEL STEERING

CROSS-REFERENCE TO RELATED APPLICATIONS

This application is a National Phase Application of PCT International Application No. PCT/IL2020/050720, International Filing Date Jun. 28, 2020, claiming the benefit of U.S. Provisional Patent Application(s) No. 62/867,901, filed Jun. 28, 2019, which are hereby incorporated by reference.

FIELD OF THE INVENTION

The present invention relates to the field of suspension systems and, more particularly, to trailing or leading arm suspension systems.

BACKGROUND OF THE INVENTION

Typically, trailing-arm suspension systems for a vehicle have suspension arms that are connected between an axle and a pivot point on a chassis of the vehicle. Unlike other suspension systems, such as double wishbone suspension systems, etc., the suspension arms of trailing-arm suspension systems are typically aligned along a general longitudinal direction of the vehicle such that pivot axes thereof are transverse to a vehicle longitudinal centerline. Typically, in order to enable a substantially linear vertical movement of the axle, the suspension arms of trailing-arm suspension systems are disposed external to a rim of the wheel. However, such trailing-arm suspension systems may occupy a significant space in the chassis of the vehicle. In some suspension systems, the suspension arms are trailing arms in which the axle is in the rear of the suspension arms along a vehicle rear-front axis. In other suspension systems, the suspension arms are leading arms in which the axle is in front of the suspension arms along the vehicle rear-front axis.

SUMMARY OF THE INVENTION

Some embodiments of the present invention provide a suspension system for a wheel of a vehicle including: a wheel interface having a wheel interface axis which is an axis about which a wheel rotates when connected to the wheel interface; a first arm connected to the wheel interface and rotatable with respect to the wheel interface about a first axis that is substantially parallel to the wheel interface axis; and a second arm connected to the wheel interface and rotatable with respect to the wheel interface about a second axis that is substantially parallel to the wheel interface axis; and a damping and springing means disposed within a gap formed between the first arm and the second arm, the damping and springing means are connected at one of its ends to at least one of the first arm, the second arm and the wheel interface; wherein at least a portion of the suspension system is to be disposed within a rim of a wheel.

In some embodiments, the suspension system includes a sub-frame to connect at least a portion of the suspension system to the reference frame of the vehicle, wherein the first arm and the second arm are connected to the sub-frame and rotatable with respect to the sub-frame about a third axis and a fourth axis, respectively, which are substantially parallel to the wheel interface axis.

In some embodiments, the damping and springing means is connected between one of the first and second arms and the sub-frame.

In some embodiments, the first arm and the second arm are connected to the wheel interface at their respective first ends and to the sub-frame at their respective second ends.

In some embodiments, the first arm, the second arm and the wheel interface are dimensioned, and positions of the first axis, the second axis, the third axis and the fourth axis are set to form a substantially parallelogram shape of the suspension system.

In some embodiments, the first arm and the second arm are rotatable with respect to the sub-frame about a steering axis.

In some embodiments, the steering axis is substantially perpendicular to the wheel interface axis.

In some embodiments, the steering axis is inclined with respect to an axis that is perpendicular to the wheel interface axis.

In some embodiments, the suspension system includes a steering arm connected to at least one of the first arm and the second arm.

In some embodiments, the steering arm is connected at its first end to at least one of the first arm and the second arm and is connectable at its second end to a steering rod, wherein the steering rod is controllable by one or more steering actuators.

In some embodiments, the suspension system includes the steering arm is connected to the first arm, the first arm is connected to the sub-frame using a joint unit, the joint unit includes a first straight pivot having an axis that coincides with the third axis and a second straight pivot having an axis that coincides with the steering axis, and the second arm is connected to the sub-frame using one of the spherical joint and universal joint.

In some embodiments, the damping and springing means is connected between the second arm, and one of the wheel interface and the sub-frame.

In some embodiments, the damping and springing means has a linear motion axis which is inclined with respect to the steering axis.

In some embodiments, the wheel interface is shaped to provide one of a positive camber angle and a negative camber angle.

In some embodiments, at least one of the first arm and the second arm is curved along its longitudinal dimension.

In some embodiments, at least one of the first arm and the second arm has an arm aperture, and wherein at least a portion of the damping and springing means is movable within the arm aperture thereof.

In some embodiments, the arm aperture is at one of ends of the respective arm.

In some embodiments, the third axis and the fourth axis are in front of the wheel interface axis along an axis that is alignable with a vehicle longitudinal axis extending from a rear end towards a front end of a vehicle.

In some embodiments, the third axis and the fourth axis are in front of the first axis and the second axis along an axis that is alignable with a vehicle longitudinal axis extending from a rear end towards a front end of a vehicle.

In some embodiments, the first axis and the second axis are in front of the wheel interface axis along an axis that is alignable with a vehicle longitudinal axis extending from a rear end towards a front end of a vehicle.

In some embodiments, the first axis and the second axis are in front of the third axis and the fourth axis along an axis that is alignable with a vehicle longitudinal axis extending from a rear end towards a front end of a vehicle.

Some embodiments of the present invention provide a suspension system for a wheel of a vehicle including: a wheel interface having a wheel interface axis which is an axis about which a wheel rotates when connected to the wheel interface; a sub-frame to connect at least a portion of the suspension system to a reference frame of the vehicle; and a first arm and a second arm connected to the wheel interface and rotatable with respect to the wheel interface about a first axis and a second axis, respectively, which are substantially parallel to the wheel interface axis, the first arm and the second arm are connected to the sub-frame and rotatable with respect to the sub-frame about a third axis and a fourth axis, respectively, which are substantially parallel to the wheel interface axis, and the first arm and the second arm are rotatable about a steering axis.

In some embodiments, the steering axis is substantially perpendicular to the wheel interface axis.

In some embodiments, the steering axis is inclined with respect to an axis that is perpendicular to the wheel interface axis.

In some embodiments, the suspension system includes a damping and springing means disposed within a gap formed between the first arm and the second arm, the damping and springing means are connected between one of: the first arm and the second arm, one of the first and second arm and the wheel interface, and one of the first and second arms and the sub-frame.

In some embodiments, the damping and springing means has a linear motion axis which is inclined with respect to the steering axis.

In some embodiments, the first arm and the second arm are connected to the wheel interface at their respective first ends and to the sub-frame at their respective second ends.

In some embodiments, the first arm, the second arm and the wheel interface are dimensioned, and positions of the first axis, the second axis, the third axis and the fourth axis are set to form a substantially parallelogram shape of the suspension system.

In some embodiments, the suspension system includes a steering arm connected at its first end to at least one of the first arm and the second arm and connectable at its second end to one or more steering actuators via a steering rod.

In some embodiments, the steering arm is connected to the first arm, the first arm is connected to the sub-frame using a joint unit, the joint unit includes a first straight pivot having an axis that coincides with the third axis and a second straight pivot having an axis that coincides with the steering axis, and the second arm is connected to the sub-frame using one of the spherical joint and universal joint.

In some embodiments, the damping and springing means is connected between the second arm, and one of the wheel interface and the sub-frame.

In some embodiments, the wheel interface is shaped to provide one of a positive camber angle and a negative camber angle.

In some embodiments, at least one of the first arm and the second arm is curved along its longitudinal dimension.

In some embodiments, at least one of the first arm and the second arm has an arm aperture, and wherein at least a portion of the damping and springing means is movable within the arm aperture thereof.

In some embodiments, the arm aperture is at one of ends of the respective arm.

In some embodiments, the third axis and the fourth axis are in front of the wheel interface axis along an axis that is alignable with a vehicle longitudinal axis extending from a rear end towards a front end of a vehicle.

In some embodiments, the third axis and the fourth axis are in front of the first axis and the second axis along an axis that is alignable with a vehicle longitudinal axis extending from a rear end towards a front end of a vehicle.

In some embodiments, the first axis and the second axis are in front of the wheel interface axis along an axis that is alignable with a vehicle longitudinal axis extending from a rear end towards a front end of a vehicle.

In some embodiments, the first axis and the second axis are in front of the third axis and the fourth axis along an axis that is alignable with a vehicle longitudinal axis extending from a rear end towards a front end of a vehicle.

Some embodiments of the present invention provide a vehicle including two or more suspension systems as described herein.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same can be carried into effect, reference will now be made, purely by way of example, to the accompanying drawings in which like numerals designate corresponding elements or sections throughout.

In the accompanying drawings:

FIGS. 1A, 1B, 1C, 1D, 1E, 1F and 1G are schematic illustrations of a suspension system, according to some embodiments of the invention;

FIG. 2A is a schematic illustration of a suspension system including a sub-frame, and of a wheel assembled into the suspension system, according to some embodiments of the invention;

FIGS. 2B and 2C are schematic illustrations of a suspension system including a sub-frame, according to some embodiments of the invention;

Figure 1A:
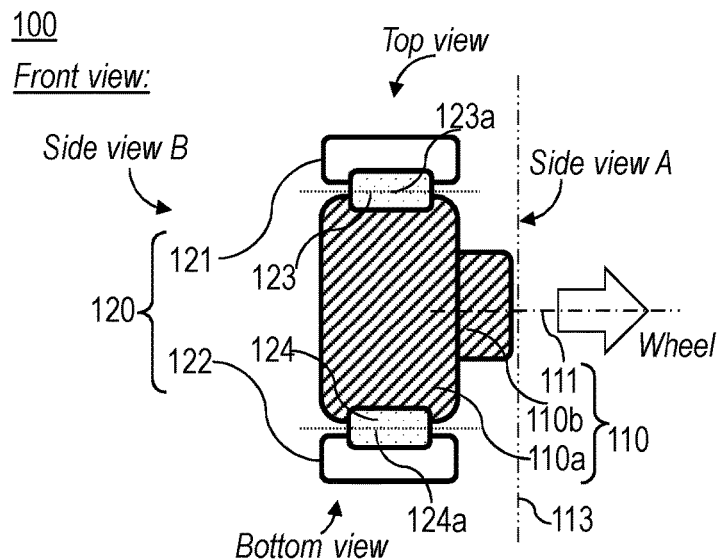

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention are described. For purposes of explanation, specific configurations and details are set forth in order to provide a thorough understanding of the present invention. However, it will also be apparent to one skilled in the art that the present invention can be practiced without the specific details presented herein. Furthermore, well known features can have been omitted or simplified in order not to obscure the present invention. With specific reference to the drawings, it is stressed that the particulars shown are by way of example and for purposes of illustrative discussion of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention can be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that can be practiced or carried out in various ways as well as to combinations of the disclosed embodiments. Also, it is to be understood that the phraseology and terminology employed herein is for the purpose of description and should not be regarded as limiting.

In the following description, the viewing direction 'front' relates to the direction as seen from the front of a vehicle to which the suspension systems described below may be attached. The viewing directions 'side', 'top', 'bottom' or ''back' are respectively related to the 'front' viewing direction. Similarly, the term "vertical" as used herein below refers to a direction that is vertical to the surface of a plane on which a vehicle assembled with the suspension systems described below is placed.

Reference is now made to FIGS. 1A, 1B, 1C, 1D, 1E, 1F and 1G, which are schematic illustrations of a suspension system 100, according to some embodiments of the invention.

Reference is also made to FIGS. 1H, 1I, 1J and 1K, which are schematic illustrations of a suspension system 100 and of a wheel 90 assembled into suspension system 100, according to some embodiments of the invention.

FIG. 1A shows a front view of suspension system 100, according to some embodiments of the invention. FIGS. 1B, 1D, 1E and FIG. 1C show opposite side views of suspension system 100, according to some embodiments of the invention. FIGS. 1F and 1G show top and bottom views of suspension system 100, respectively, according to some embodiments of the invention. FIGS. 1H, 1J and 1K show front view of suspension system 100 and of wheel 90 assembled thereto, according to some embodiments of the invention. FIG. 1I shows top view of suspension system 100 and of wheel 90 assembled thereto, according to some embodiments of the invention.

According to some embodiments of the invention, suspension system 100 includes a wheel interface 110 and a suspension assembly 120 (e.g., as shown in FIGS. 1A-1I).

Wheel interface 110 may enable connection of wheel 90 thereto and may have a wheel interface axis 111 which is an axis about which wheel 90 may rotate when attached to wheel interface 110. Wheel interface 110 may be a structural element that is made of, for example, steel, Aluminum, and composite material. Wheel interface 110 may, for example, include, a wheel knuckle, a wheel upright, a wheel hub, a wheel bearing, etc.

According to some embodiments of the invention, suspension assembly 120 includes a first arm 121 and a second arm 122. First arm 121 and second arm 122 may be, for example, elongated structural elements made of, for example, steel, Aluminum, and composite material. First arm 121 may be connected to wheel interface 110 and may be rotatable with respect to wheel interface 110 about a first axis 123a that may be parallel (or substantially parallel) to wheel interface axis 111. In some embodiments, first arm 121 is connected at its first end 121a to wheel interface using a first pivot connection 123. Second arm 122 may be connected to wheel interface 110 and may be rotatable with respect to wheel interface 110 about a second axis 124a that may be parallel (or substantially parallel) to wheel interface axis 111. In some embodiments, second arm 122 is connected at its first end 122a to wheel interface 110 using a second pivot connection 124. In various embodiments, first arm 121 and/or second arm 122 are parallel (or substantially parallel) to a wheel interface plane 113 that is perpendicular to wheel interface axis 111. In various embodiments, each of first pivot connection 123 and second pivot connection 124 may be a straight pivot (e.g., bearing or rotary joint) or a spherical joint.

Wheel interface 110 may have different shapes. In embodiments shown in FIGS. 1A-1K, wheel interface 110 includes a first wheel interface portion 110a extending between first axis 123a and second axis 124a, and a second wheel interface portion 110b that is perpendicular to first wheel interface portion 110a and extending from first wheel interface portion 110a towards wheel interface axis 111.

In some embodiments, wheel interface axis 111 is in front of first axis 123a and second axis 124a along an axis 101 that is alignable with a vehicle longitudinal axis extending from a rear end towards a front end of a vehicle (e.g., trailing arms configuration of suspension system 100; as shown in FIGS. 1B-1G).

In some embodiments, first axis 123a and second axis 124a are in front of wheel interface axis 111 along axis 101 (e.g., leading arms configuration of suspension system 100).

According to some embodiments of the invention, suspension system 100 includes damping and springing means 128. Damping and springing means 128 may restrain motions and may support a weight of the vehicle (e.g., when wheel 90 is assembled into suspension system 100) along (or substantially along) a vertical axis of the vehicle. Damping and springing means 128 may, for example, include a spring damper configured as a coil-over or coil-over shock absorber. The spring damper may, for example, be a linear, rotational, air spring and/or an electronic/electromagnetic damper.

Figure 1B:
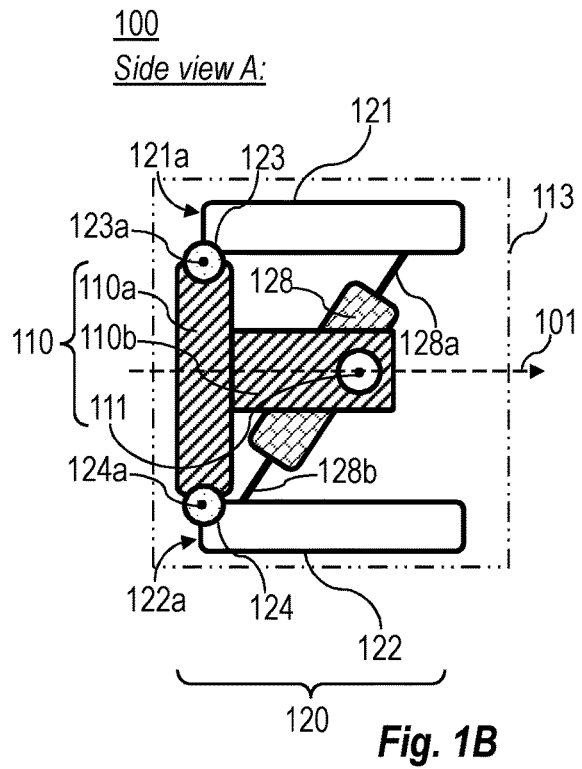
Figure 1C:
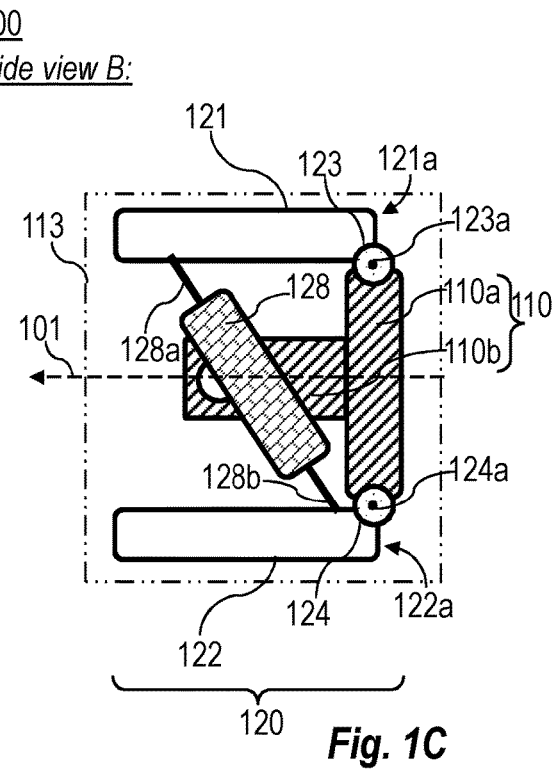
Figure 1H:
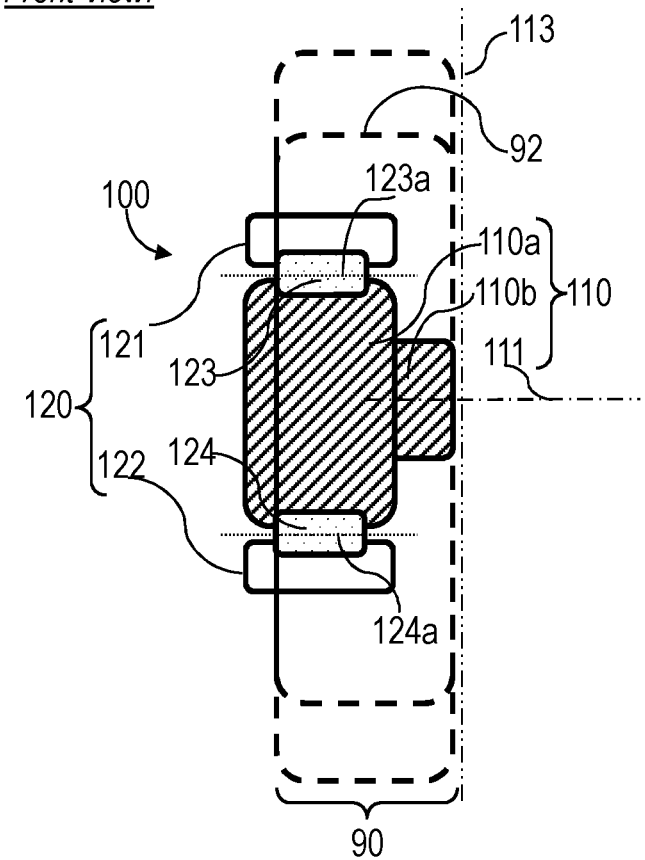
FIGS. 1H, 1I, 1J and 1K are schematic illustrations of a suspension system and of a wheel assembled into the suspension system, according to some embodiments of the invention.
Figure 1I:
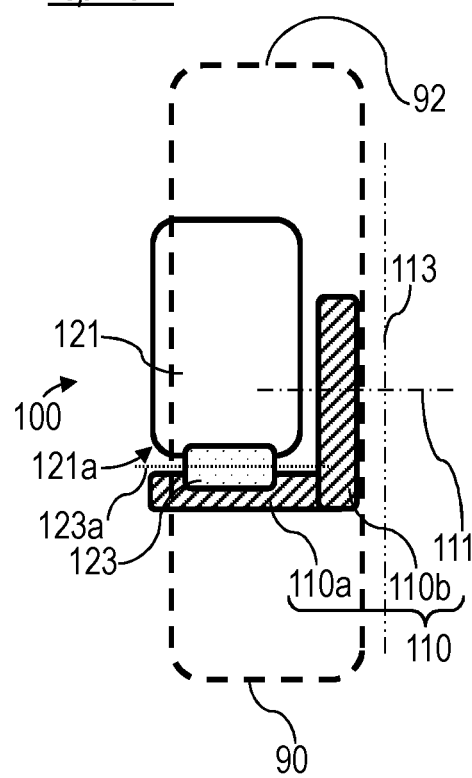
Figure 1J:
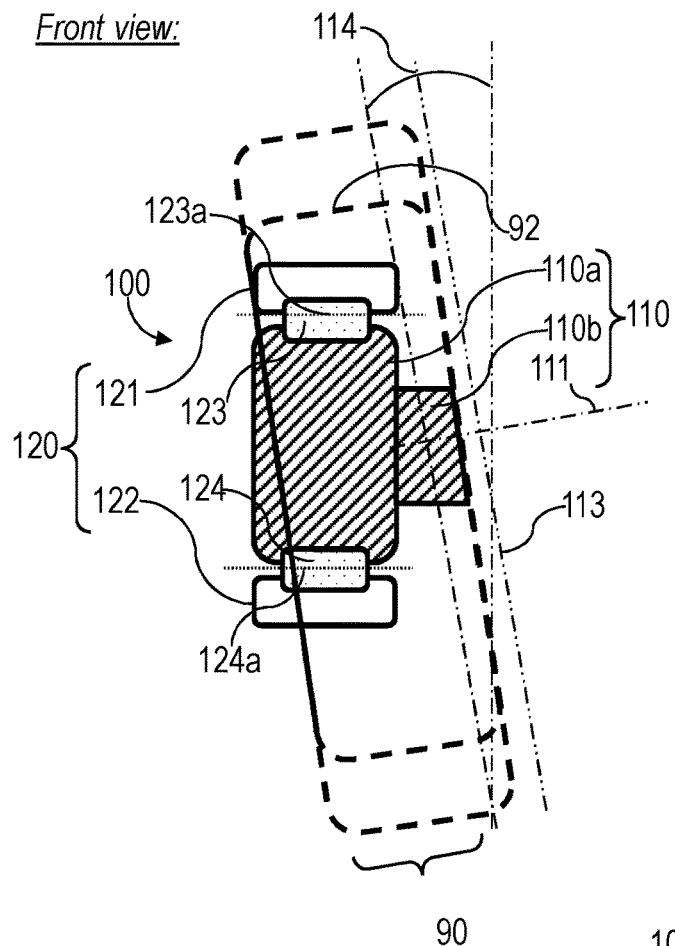
Figure 1K:
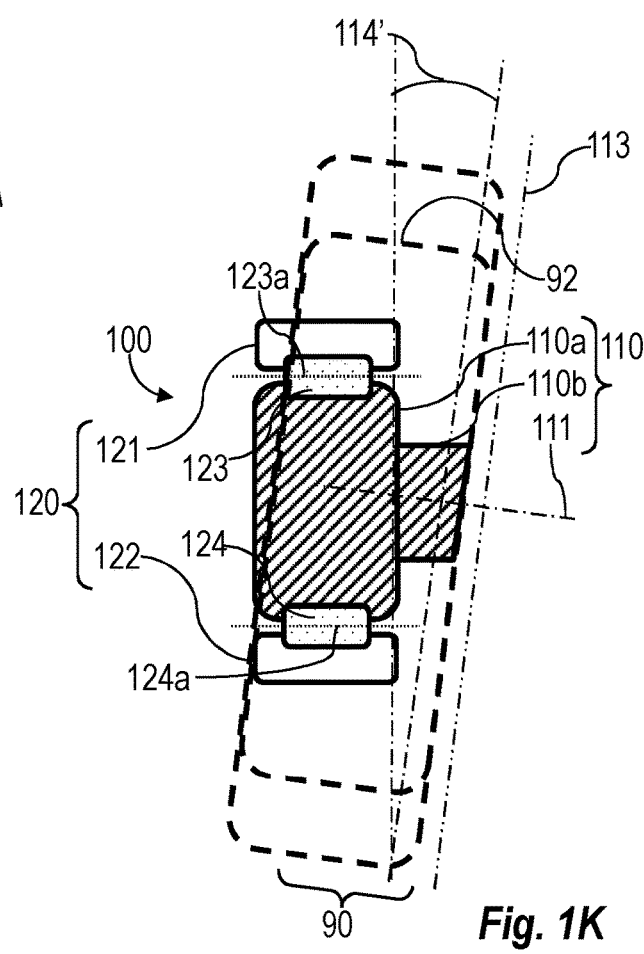

Damping and springing means 128 may be connected (e.g., between its first end 128a and second end 128b) between, for example, first arm 121 and second arm 122 (e.g., as shown in FIGS. 1B and 1C). In another example, damping and springing means 128 may be connected between one of arms 121, 122 and wheel interface 110 (e.g., as shown in FIGS. 1D and 1E). In another example, damping and springing means 128 may be connected between one of arms 121, 122 and a sub-frame of suspension system 100 (e.g., such as sub-frame 105 described below with respect to FIGS. 2A, 2B and 2C). In another example, damping and springing means 128 may be connected between one of arms 121, 122 and a reference frame of the vehicle (e.g., such as chassis) or a sub-frame (e.g., such as a sub-frame 105 described below with respect to FIGS. 2A, 2B and 2C).

In some embodiments, at least a portion of suspension system 100 is to be disposed within a rim 92 of wheel 90. For example, at least a portion of suspension system 100 is disposed within a rim 92 of wheel 90 when wheel 90 is assembled into suspension system 100 (e.g., as shown in FIGS. 1H and 1I). For example, at least 25% of suspension system 100 is to be disposed within a volume of rim 92 of wheel 90. In some embodiments, at least 75% of wheel interface 210 is to be disposed within a volume of rim 92 of wheel 90. In some embodiments, at least 75% of one or more of arms 221 and 222 is to be disposed within a volume of rim 92 of wheel 90. In some embodiments, a length and a height of suspension system 100 is smaller than a diameter of rim 92 of wheel 90 to be assembled into suspension system 100.

In various embodiments, wheel interface 110 is shaped to provide a positive camber angle 114 (e.g., as shown in FIG. 1J) or a negative camber angle 114' (e.g., as shown in FIG. 1K) for wheel 90. In some embodiments, camber angles 114, 114' is constant (or substantially constant).

Reference is now made to FIG. 2A, which is a schematic illustration of a suspension system 100 including a sub-frame 105, and of a wheel 90 assembled into suspension system 100, according to some embodiments of the invention.

Reference is also made to FIGS. 2B and 2C, which are schematic illustrations of a suspension system 100 including a sub-frame 105, according to some embodiments of the invention.

FIG. 2A shows a side view of suspension system 100 and of wheel 90 assembled into suspension system 100, according to some embodiments of the invention. FIG. 2B shows a top view of suspension system 100, according to some embodiments of the invention. FIG. 2C shows a bottom view of suspension system 100, according to some embodiments of the invention.

According to some embodiments of the invention, suspension system 100 includes a sub-frame 105. Sub-frame 105 may be a structural element made of, for example, steel, Aluminum, and composite material. Sub-frame 105 may connect at least a portion of suspension system 100 to a reference frame (e.g., chassis) of the vehicle.

In some embodiments, suspension assembly 120 is connected to sub-frame 105. First arm 121 may be connected to sub-frame 105 and may be rotatable with respect to sub-frame 105 about a third axis 125a that is parallel (or substantially parallel) to wheel interface axis 111. In some embodiments, first arm 121 is connected at its second end 121b to sub-frame 105 using a third pivot connection 125. Second arm 122 may be connected to sub-frame 105 and may be rotatable with respect to sub-frame 105 about a fourth axis 126a that is parallel (or substantially parallel) to wheel interface axis 111. In some embodiments, second arm 122 is connected at its second end 122b using a fourth pivot connection 126. In various embodiments, each of third pivot connection 125 and fourth pivot connection 126 may be a straight pivot (e.g., bearing or rotary joint) or a spherical joint.

In some embodiments, first arm 121, second arm 122 and wheel interface 110 are dimensioned, and positions of first axis 123a, second axis 124a, third axis 125a and fourth axis 126a are set to cause a substantially linear motion of wheel interface 110 along a wheel interface motion axis 112 which is an axis that is perpendicular to wheel interface axis 111. In some embodiments, first arm 121, second arm 122 and wheel interface 110 are dimensioned, and positions of first axis 123a, second axis 124a, third axis 125a and fourth axis 126a are set to form a substantially parallelogram shape of suspension system 100. This may, for example, cause a substantially linear motion of wheel interface 110 along a wheel interface motion axis 112 which is an axis that is perpendicular to wheel interface axis 111.

Wheel interface motion axis 112 may be parallel (or substantially parallel) to a vertical axis 72 of the vehicle assembled with suspension system 100. This may, for example, cause substantially linear motion of wheel interface 110 along an axis that is parallel to vertical axis 72 of the vehicle assembled with suspension system 100.

In some embodiments, e.g., in embodiments without sub-frame 105, suspension assembly 120 is directly connectable to the reference frame of the vehicle. For example, first arm 121 and second arm 122 may be connected to the reference frame of the vehicle and may be rotatable with respect to the reference frame about third axis 123a and fourth axis 124a, respectively.

In some embodiments, third axis 125a and fourth axis 126a are in front of first axis 123a and second axis 124a along an axis 101 that is alignable with a vehicle longitudinal axis extending from a rear end towards a front end of a vehicle (e.g., trailing arms configuration of suspension system 100; as shown in FIG. 2A). In some embodiments, third axis 125a and fourth axis 126a are in front of wheel interface axis 111 along axis 101 (e.g., trailing arms configuration of suspension system 100; as shown in FIG. 2A).

In some embodiments, first axis 123a and second axis 124a are in front of third axis 125a and fourth axis 126a along axis 101 (e.g., leading arms configuration of suspension system 100). In some embodiments, first axis 123a and second axis 124a are in front of wheel interface axis 111 along axis 101 (e.g., leading arms configuration of suspension system 100).

In some embodiments, suspension system 100 is capable of operating with a powertrain sub-system. The powertrain sub-system may include a rotational motor/a half-shaft and a transmission shaft to connect the rotational motor/the half-shaft with wheel interface 110. The transmission shaft may transmit the torque force from the rotational motor/a half-shaft of a powertrain sub-system of the vehicle to thereby rotate wheel 90 when wheel 90 is assembled into suspension system 100.

In some embodiments, a gap 118 is formed between first arm 121 and second arm 122 of suspension assembly 120. Gap 118 may be used to accommodate one or more components of one or more sub-systems of the vehicle. For example, gap 118 may accommodate the transmission shaft of the powertrain sub-system, wherein the transmission shaft may extend from the reference frame of the vehicle towards wheel interface 110/wheel 90. In some embodiments, damping and springing means 128 are disposed within gap 118.

In various embodiments, first arm 121 and/or second arm 122 are curved. Curved arms may have a longer distance along their curved longitudinal dimension as compared to straight arms. This may, for example, cause wheel interface 110 to travel a longer distance along wheel interface motion axis 112 as compared to embodiments with straight first arm 121 and/or second arm 122. This may also increase a gap between the curved arms as compared to gap 118 formed between straight arms. The increased gap may, for example, provide more space for the one or more components of the one or more sub-systems of the vehicle.

Figure 3A:
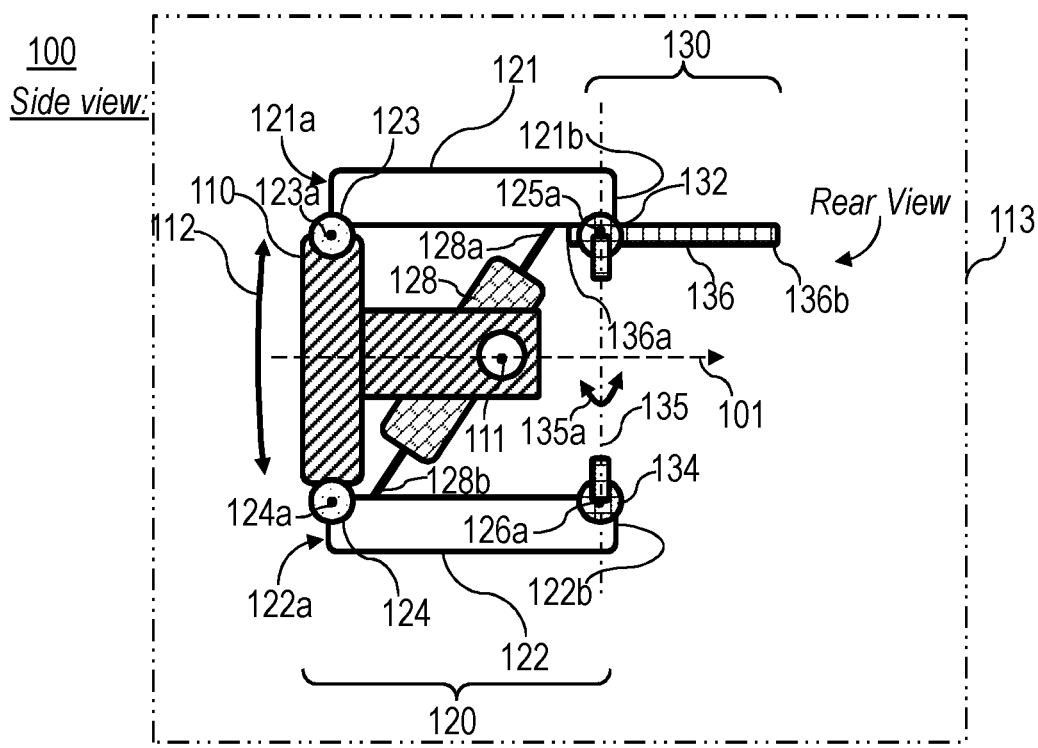
FIGS. 3A, 3B and 3C are schematic illustrations of a suspension system including a steering assembly, according to some embodiments of the invention.
Figure 3B:
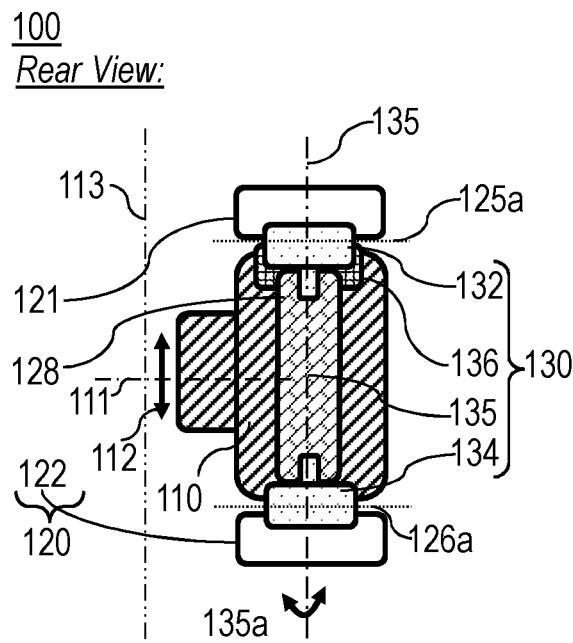
Figure 3C:
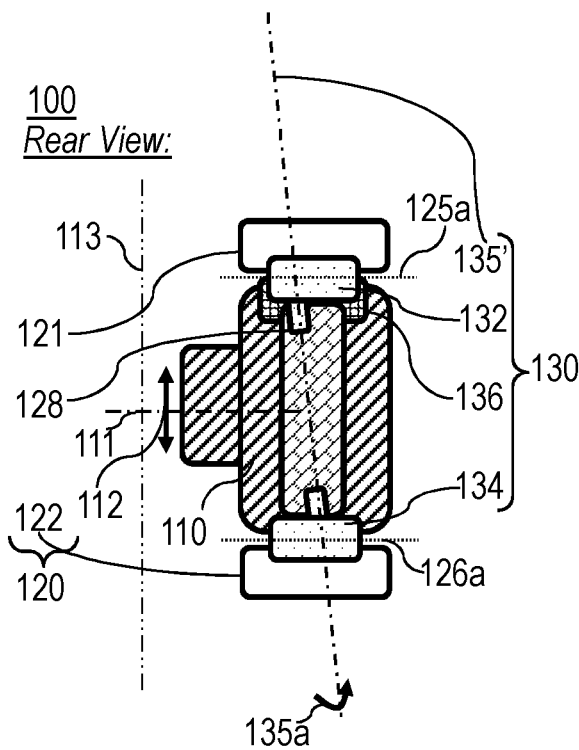

Reference is now made to FIGS. 3A, 3B and 3C, which are schematic illustrations of a suspension system 100 including a steering assembly 130, according to some embodiments of the invention.

FIG. 3A shows a side view of suspension system 100, according to some embodiments of the invention. FIGS. 3B and 3C show a rear view of suspension system 100 for different steering axis angles 135, 135', according to some embodiments of the invention.

According to some embodiments of the invention, suspension system 100 includes a steering assembly 130. Steering assembly 130 may have a steering axis 135. In some embodiments, steering axis 135 is perpendicular (or substantially perpendicular) to wheel interface axis 111. Steering assembly 130 may be connected to suspension assembly 120 and may cause a steering rotation 135a of suspension assembly 120 and of wheel interface 110 about steering axis 135.

In various embodiments, first arm 121 and second arm 122 are connectable to the sub-frame/the reference frame and are rotatable about third axis 125a and four axis 126a, respectively (e.g., as described above with respect to FIGS. 2A, 2B and 2C) and about steering axis 135. It is noted that the sub-frame and the reference frame are not shown in FIGS. 3A, 3B and 3C for sake of clarity.

In some embodiments, steering assembly 130 includes a fifth pivot connection 132 and a sixth pivot connection 134 positioned along steering axis 135. First arm 121 may be connected, for example at its second end 121b, to the sub-frame/reference frame using fifth pivot connection 132. Second arm 122 may be connected, for example at its second end 122b, to the sub-frame/reference frame using sixth pivot connection 134. In various embodiments, each of fifth pivot connection 132 and sixth pivot connection 134 includes one or more straight pivots (e.g., bearing or rotary joint), a universal joint, or a spherical joint.

In some embodiments, fifth pivot connection 132 and sixth pivot connection 134 are designed so as to cause movement of components of suspension assembly 120 in a plane that is parallel to wheel interface plane 113 without causing movement of steering assembly 130. For example, each of fifth pivot connection 132 and sixth pivot connection 134 may be one of a spherical joint, a joint unit comprised of two straight pivots perpendicular to each other and a combination thereof. One example of such design is described below with respect to FIGS. 4A and 4B. This may, for example, minimize an unintended steering rotation (e.g., bump steering) of suspension assembly 120 and wheel interface 110 as compared to current suspension systems (e.g., such as trailing arm suspension systems).

In some embodiments, steering assembly 130 has an inclined steering axis 135'. Steering axis 135' may be inclined with respect to an axis that is perpendicular to wheel interface axis 111 (e.g., with respect to the vertical axis of the vehicle assemble with suspension system 100). For example, locations of fifth pivot connection 132 and of sixth pivot connection 134 at first arm 121 and second arm 122, respectively, may be set to provide inclined steering axis 135' (e.g., as shown in FIG. 3C). In some embodiments, inclined steering axis 135' is constant (or substantially constant). In some embodiments, inclined steering axis 135' is adjustable. For example, inclined axis 135' may be adjusted by changing a distance between fifth pivot connection 132 and sixth pivot connection 134 along an axis that is parallel to wheel interface axis 111.

In some embodiments, damping and springing means 128 has a linear motion axis. In some embodiments, the linear motion axis of damping and springing means 128 is inclined with respect to steering axis 135.

In some embodiments, steering assembly 130 includes a steering arm 136. Steering arm 136 may be connected to suspension assembly 120. For example, steering arm 136 may be connected at its first end 136a to first arm 121 of suspension assembly 120. The connection of steering arm 136 to suspension assembly 120 may be direct or via fifth pivot connection 132 (e.g., as shown in FIGS. 3A, 3B and 3C) and/or via sixth pivot connection 134.

In some embodiments, steering assembly 130 is operated by a mechanical steering sub-system. For example, the mechanical steering sub-system includes a steering rod/push rod/tie rod connected to steering arm 136 and capable of operating steering arm 136.

In some embodiments, steering assembly 130 is operated by one or more electrical motors. For example, the electrical motor(s) may control rotational movement of at least one of suspension assembly 120 and steering arm 136 about steering axis 135.

In some embodiments, steering assembly 130 is operated by a steer-by-wire sub-system. The steer-by-wire sub-system may include one or more actuators connected to at least one of suspension assembly 120 and steering arm 136. The actuator(s) may control the rotational movement of at least one of suspension assembly 120 and steering arm 136 about steering axis 135.

In some embodiments, steering arm 136 of steering assembly 130 is connected to first arm 121 of suspension assembly 120. This may, for example, cause first arm 121 to carry lateral loads (e.g., in a direction along wheel interface axis 111) being applied on suspension assembly 120 by wheel 90, and steering loads applied on suspension assembly 120 by steering arm 136. This may, for example, cause second arm 122 of suspension assembly 120 to be free of at least the steering loads thereof and to carry the lateral loads and vertical loads (e.g., in a direction along wheel interface motion axis 112/vertical axis 72 of the vehicle) being applied on suspension assembly 120 by wheel 90. This may, for example, cause movement of components of suspension assembly 120 in a plane that is parallel to wheel interface plane 113 without causing movement of steering assembly 130.

In some embodiments, second arm 122 of suspension assembly 120 is connected to damping and springing means 128. This may, for example, cause second arm 122 to carry lateral loads (e.g., in a direction along wheel interface axis 111) and vertical loads (e.g., in a direction along wheel interface motion axis 112/vertical axis 72 of the vehicle) being applied on suspension assembly 120 by wheel 90. This may, for example, cause first arm 121 of suspension assembly 120 to be free of the vertical loads, as the vertical loads may be transferred via wheel interface 110, second arm 122 and damping and springing means 128, e.g., bypassing first arm 121.

In some embodiments, first arm 121 of suspension assembly 120 may be connected to damping and springing means 128 and second arm 121 of suspension assembly 120 may be connected to steering arm 136 of steering assembly 130.

Figure 4A:
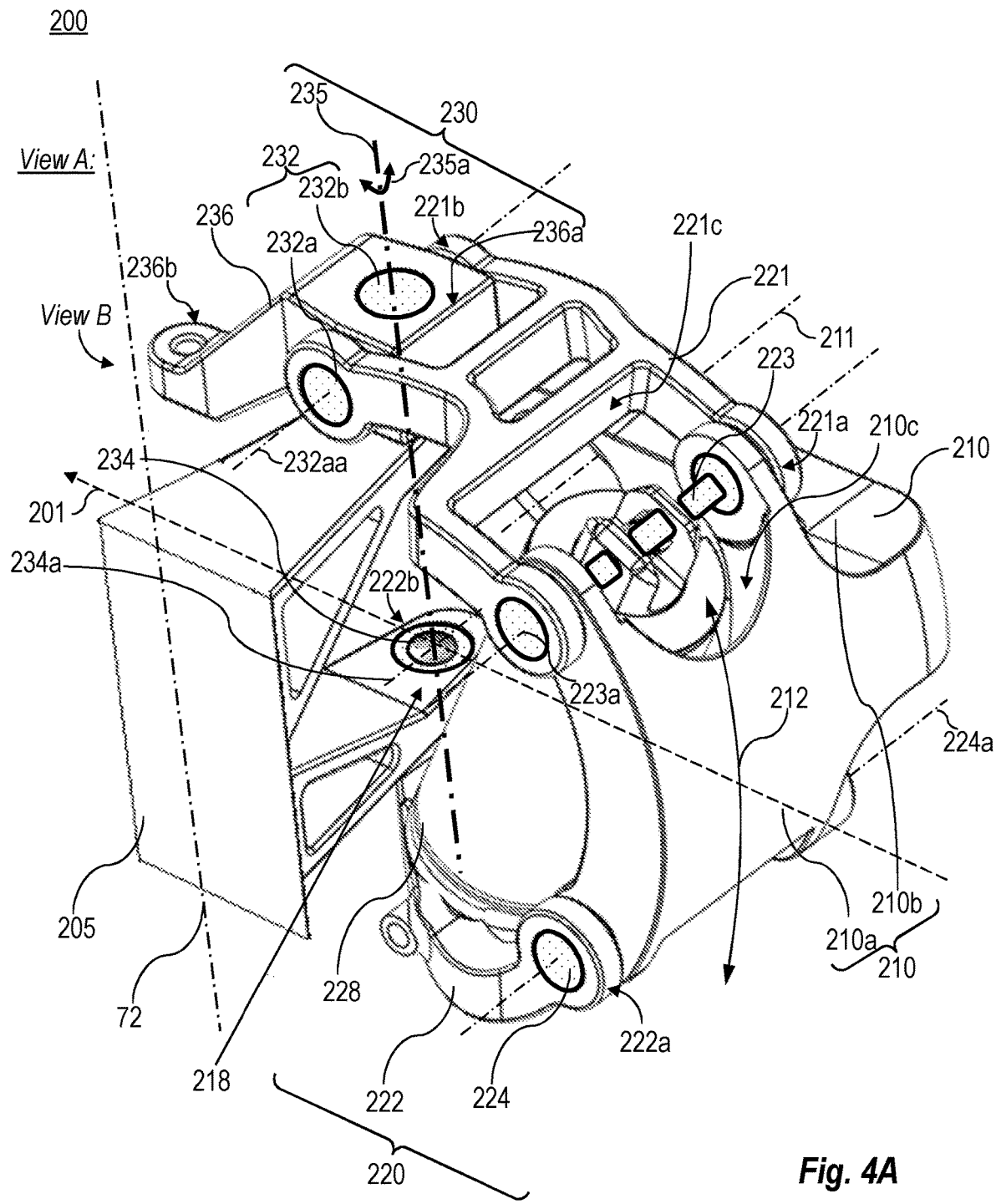
FIGS. 4A and 4B are schematic illustrations of one embodiment of a suspension system, according to some embodiments of the invention.
Figure 4B:
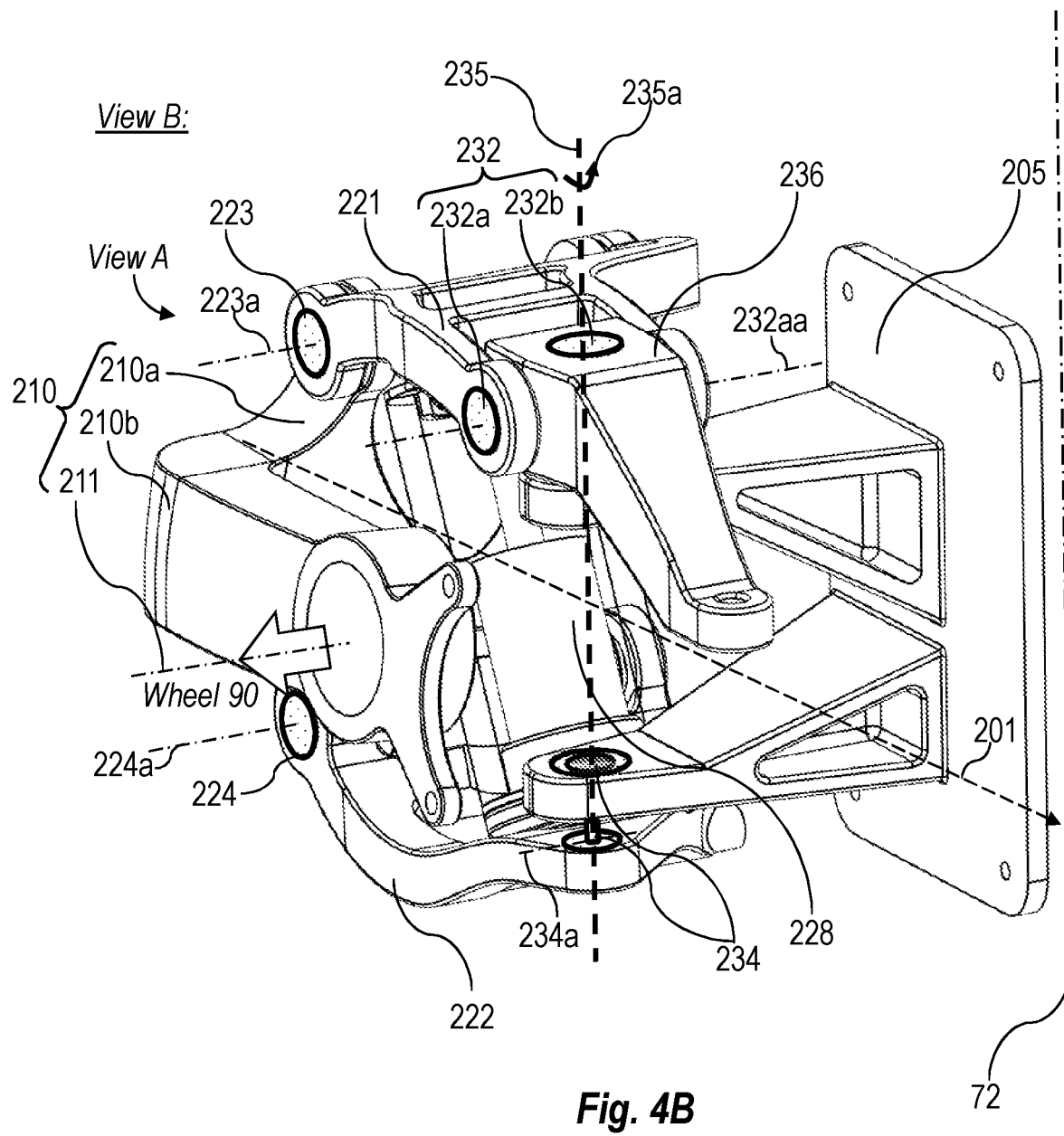

Reference is now made to FIGS. 4A and 4B, which are schematic illustrations of one embodiment of a suspension system 200, according to some embodiments of the invention.

Figure 4C:
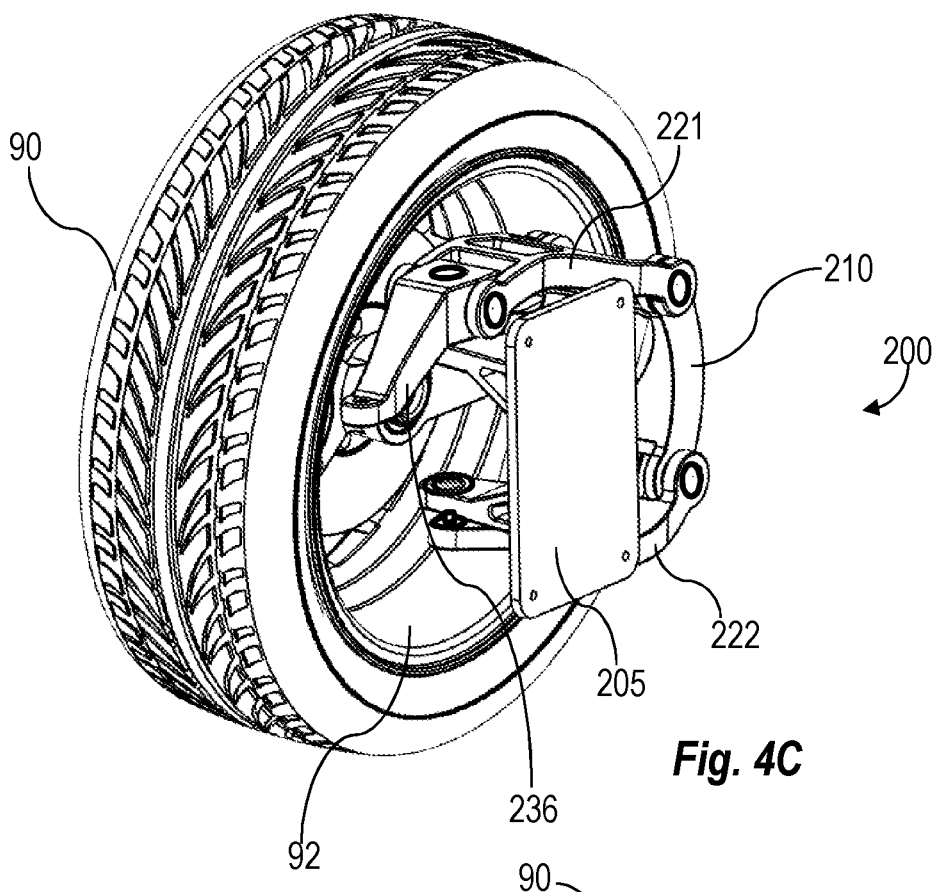
FIGS. 4C and 4D are schematic illustrations of one embodiment of a suspension system and of a wheel assembled within suspension system, according to some embodiments of the invention.
Figure 4D:
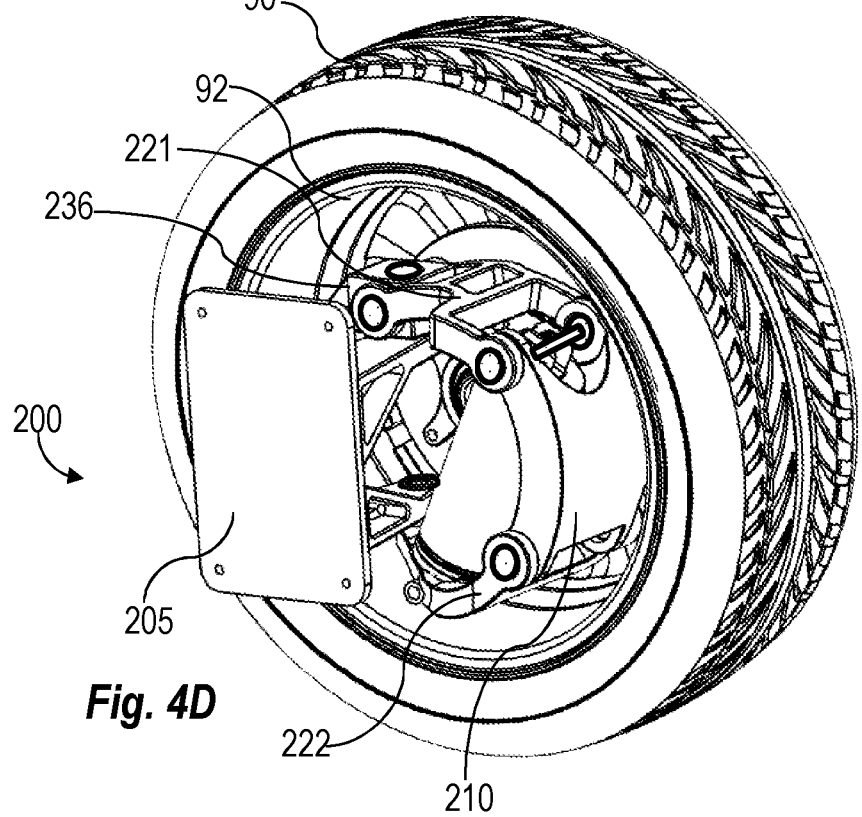

Reference is also made to FIGS. 4C and 4D, which are schematic illustrations of one embodiment of a suspension system 200 and of a wheel 90 assembled within suspension system 200, according to some embodiments of the invention.

FIGS. 4A and 4B show opposite panoramic views of suspension system 200, according to some embodiments of the invention. FIGS. 4C and 4D show opposite panoramic views of suspension system 200 and of wheel 90 assembled within suspension system 200, according to some embodiments of the invention.

According to some embodiments of the invention, suspension system 200 includes a sub-frame 205, a wheel interface 210, a suspension assembly 220, a damping and springing means 228 and a steering assembly 230 (e.g., as shown in FIG. 4A).

For example, sub-frame 205 may be similar to sub-frame 105 described above with respect to FIGS. 2A-2C. Wheel interface 210 may be similar to, for example, wheel interface 110 described above with respect to FIGS. 1A-1K, FIGS. 2A-2C and FIGS. 3A-3C. Suspension assembly 220 may be similar to, for example, suspension assembly 120 described above with respect to FIGS. 1A-1K, FIGS. 2A-2C and FIGS. 3A-3C. Damping and springing means 228 may be similar to, for example, damping and springing means 128 described above with respect to FIGS. 1A-1K, FIGS. 2A-2C and FIGS. 3A-3C. Steering assembly 230 may be similar to, for example, steering assembly 130 described above with respect to FIGS. 3A-3C.

Sub-frame 205 may be a structural element made of, for example, steel, Aluminum, and composite material. Sub-frame 205 may connect at least a portion of suspension system 200 to a reference frame (e.g., chassis) of the vehicle. In some embodiments, suspension assembly 220 of suspension system 200 is connected to sub-frame 205.

Wheel interface 210 may enable connection of wheel 90 thereto and may have a wheel interface axis 211 which is an axis about which wheel 90 may rotate when attached to wheel interface 210. Wheel interface 210 may, for example, include, a wheel knuckle, a wheel upright and/or other attachment mechanisms as are known in the art to attach a wheel to the suspension system.

In some embodiments, suspension assembly 220 includes a first arm 221 and a second arm 222. For example, first arm 221 and second arm 222 may be similar to first arm 121 and second arm 122, respectively, as described above with respect to FIGS. 1A-1K.

First arm 221 may be connected to wheel interface 210 and may be rotatable with respect to wheel interface 210 about a first axis 223a that may be parallel (or substantially parallel) to wheel interface axis 211. In some embodiments, first arm 221 is connected at its first end 221a to wheel interface using a first pivot connection 223. Second arm 222 may be connected to wheel interface 210 and may be rotatable with respect to wheel interface 210 about a second axis 224a that may be parallel (or substantially parallel) to wheel interface axis 211. In some embodiments, second arm 222 is connected at its first end 222a to wheel interface 210 using a second pivot connection 224. In various embodiments, first arm 221 and/or second arm 222 may be parallel (or substantially parallel) to a wheel interface plane 213 that is perpendicular to wheel interface axis 211. In various embodiments, each of first pivot connection 223 and second pivot connection 224 may be a straight pivot (e.g., bearing or rotary joint) or a spherical joint. For example, as shown in FIG. 2A, first pivot connection 223 and second pivot connection 224 may be straight pivots (e.g., bearing, rotary pivot, etc.).

Wheel interface 210 may have different shapes. In embodiments shown in FIGS. 4A and 4B, wheel interface 210 includes a first wheel interface portion 210a extending between first axis 223a and second axis 224a, and a second wheel interface portion 210b that is perpendicular to first wheel interface portion 210a and extending from first wheel interface portion 210a towards wheel interface axis 211.

Steering assembly 230 may have a steering axis 235. In some embodiments, steering axis 235 is perpendicular (or substantially perpendicular) to wheel interface axis 211. Steering assembly 230 may cause a steering rotation 235a of suspension assembly 220 and wheel interface 210 about steering axis 235 and suspension motion of suspension assembly 220.

In some embodiments, steering assembly 230 includes a fifth pivot connection 232, a sixth pivot connection 234 and a steering arm 236. For example, fifth pivot connection 232, sixth pivot connection 234 and steering arm 236 may be similar to fifth pivot connection 132, sixth pivot connection 134 and steering arm 136, respectively, described above with respect to FIGS. 3A-3C.

First arm 221 may be connected, for example at its second end 221b, to sub-frame 205 using fifth pivot connection 232. Second arm 222 may be connected, for example at its second end 222b, to sub-frame 205 using sixth pivot connection 234. In various embodiments, each of fifth pivot connection 232 and sixth pivot connection 234 includes one or more straight pivot (e.g., bearing or rotary joint), a universal joint, or a spherical joint.

Fifth pivot connection 232 and sixth pivot connection 234 may cause steering rotation 235a of first arm 221 and second arm 222, respectively, about steering axis 235 and rotation of first arm 221 and second arm 222 about a third axis 232aa and a fourth axis 234a, respectively, that are parallel (or substantially parallel) to wheel interface axis 211.

For example, in embodiments shown in FIG. 4A, fifth pivot connection 232 includes a first straight pivot 232a having third axis 232aa parallel to wheel interface axis 211 and a second straight pivot 232b having an axis which coincides with steering axis 235. This may, for example, cause rotation of first arm 221 about steering axis 235 and about third axis 232aa.

Yet, in embodiments shown in FIG. 4A, sixth pivot connection 234 may be one of a spherical joint and a universal joint to cause rotation of second arm 222 about steering axis 235 and about fourth axis 234a.

In some embodiments, third axis 232aa and fourth axis 234a are in front of first axis 223a and second axis 224a along an axis 201 that is alignable with a vehicle longitudinal axis extending from a rear end towards a front end of a vehicle (e.g., trailing arms configuration of suspension system 200; as shown in FIGS. 4A and 4B). In some embodiments, third axis 232aa and fourth axis 234a are in front of wheel interface axis 211 along axis 201 (e.g., trailing arms configuration of suspension system 200).

In some embodiments, first axis 223a and second axis 224a are in front of third axis 232aa and fourth axis 234a along axis 201 (e.g., leading arms configuration of suspension system 200). In some embodiments, first axis 223a and second axis 224a are in front of wheel interface axis 211 along axis 201 (e.g., leading arms configuration of suspension system 200).

Fifth pivot connection 232 and sixth pivot connection 234, e.g., as described with respect to and shown in FIGS. 4A and 4B, may cause movement of components of suspension assembly 220 in a plane that is parallel to a wheel interface plane 213 (e.g., that is perpendicular to wheel interface axis 211) without causing movement of steering assembly 230. This may, for example, minimize an unintended steering rotation (e.g., bump steering) of suspension assembly 220 and wheel interface 210 as compared to current suspension systems (e.g., such as trailing arm suspension systems).

Steering arm 236 may be connected to suspension assembly 220. For example, steering arm 236 may be connected at its first end 236a to first arm 221 of suspension assembly 220.

Damping and springing means 228 may be connected between, for example, first arm 221 and second arm 222, between one of arms 221, 222 and wheel interface 210 or between one of arms 221, 222 and sub-frame 205/the reference frame of the vehicle.

In some embodiments, first arm 221, second arm 222 and wheel interface 210 are dimensioned, and positions of first axis 223a, second axis 224a, third axis 232aa and fourth axis 234a are set to cause a substantially linear motion of wheel interface 210 along a wheel interface motion axis 212 which is an axis that is perpendicular to wheel interface axis 211. In some embodiments, first arm 221, second arm 222 and wheel interface 210 are dimensioned, and positions of first axis 223a, second axis 224a, third axis 232aa and fourth axis 234a are set to form a substantially parallelogram shape of suspension system 200. This may, for example, cause a substantially linear motion of wheel interface 210 along a wheel interface motion axis 212 which is an axis that is perpendicular to wheel interface axis 211.

Wheel interface motion axis 212 may be parallel to vertical axis 72 of the vehicle assembled with suspension system 200. This may, for example, cause substantially linear motion of wheel interface 110 along an axis that is parallel to vertical axis 72 of the vehicle assembled with suspension system 100.

In some embodiments, steering axis 235 of steering assembly 230 is an inclined steering axis (e.g., as described above with respect to FIG. 3C).

In various embodiments, wheel interface 210 is shaped to cause a positive or a negative camber angle (e.g., as described above with respect to FIGS. 1J-1K).

In some embodiments, at least a portion of suspension system 200 is to be disposed within a rim 92 of wheel 90. For example, at least a portion of suspension system 200 is to be disposed within a rim 92 of wheel 90 when wheel 90 is assembled into suspension system 200 (e.g., as shown in FIGS. 4C and 4D). For example, at least 25% of suspension system 200 is to be disposed within a volume of rim 92 of wheel 90. In some embodiments, at least 75% of wheel interface 210 is to be disposed within a volume of rim 92 of wheel 90. In some embodiments, at least 75% of one or more of arms 221 and 222 is to be disposed within a volume of rim 92 of wheel 90. In some embodiments, e.g., as shown for example in FIG. 2A, a length and a height of suspension system 200 is smaller than a diameter of rim 92 of wheel 90. In some embodiments, a maximal length and a maximal height of suspension system 200 is smaller than a diameter of rim 92 of wheel 90.

In some embodiments, suspension system 200 is capable of operating with a powertrain sub-system. The powertrain sub-system may include a rotational motor/a half-shaft and a transmission shaft to connect the rotational motor/the half-shaft with wheel interface 210. The transmission shaft may transmit the torque force from the rotational motor/the half-shaft of a powertrain sub-system of the vehicle to thereby rotate wheel 90 when wheel 90 is assembled into suspension system 200.

In some embodiments, a gap 218 is formed between first arm 221 and second arm 222 of suspension assembly 220. Gap 218 may be used to accommodate one or more components of one or more sub-systems of the vehicle. For example, gap 218 may accommodate the transmission shaft of the powertrain sub-system, wherein the transmission shaft may extend from the reference frame of the vehicle towards wheel interface 110/wheel 90. In some embodiments, damping and springing means 228 are disposed within gap 218.

In various embodiments, first arm 221 and/or second arm 222 are curved (e.g., as shown in FIGS. 4A and 4B). Curved arms may have a longer distance along their curved longitudinal dimension as compared to straight arms. This may, for example, cause wheel interface 210 to travel a longer distance along wheel interface motion axis 212 as compared to embodiments with straight first arm 221 and/or second arm 222. This may also increase a gap 218 between the curved arms as compared to gap between straight arms. The increased gap 218 may, for example, provide more space for the one or more components of the one or more sub-systems of the vehicle.

In some embodiments, at least one of first arm 221, second arm 222 and wheel interface 110 includes an aperture. In some embodiments, at least a portion of damping and springing means 228 is disposed within the aperture thereof. In some embodiments, at least a portion of damping and springing means 228 is movable within the aperture thereof. This may, for example, allow wheel interface 210 to travel a longer distance along wheel interface motion axis 212 as compared to embodiments without the aperture.

For example, in embodiments shown in FIG. 4A, first arm 221 includes a first arm aperture 221c and wheel interface 210 includes a wheel interface aperture 210c. At least a portion of damping and springing means 228 may be disposed and/or movable within at least one of first arm aperture 221c and wheel interface aperture 210c. In some embodiments, first arm aperture 221c is disposed at first end 221a of first arm 221 (e.g., adjacent to first axis 223a; as shown in FIG. 4A). In some embodiments, wheel interface aperture 210c is disposed an end of wheel interface 210 that is adjacent to first axis 223 (e.g., as shown in FIG. 4A).

In some embodiments, second arm 222 includes a second arm aperture. The second arm aperture may be similar to first arm aperture 221c of first arm 221.

Some embodiments of the present invention may provide a vehicle including two or more suspension systems described elsewhere herein (such as, suspension system 100 and suspension system 200). In some embodiments, the vehicle includes two or more wheels assembled into the suspension systems (for example as described elsewhere herein). The vehicle may, for example, be a passenger car, a commercial vehicle, a sport utility vehicle, an electrical car, a van, etc.

In some embodiments, at least two of the suspension systems are assembled to the vehicle in a leading arms configuration in which axels are in front of the arms of the suspension systems along a vehicle rear-front axis. In some embodiments, at least two of the suspension systems are assembled in a trailing arms configuration in which axels are in the rear of the arms of the suspension systems along the vehicle rear-front axis.

Advantageously, the disclosed suspension systems, or at least a portion thereof (e.g., at least 25%), may be located within the rim of the wheel, e.g., when the wheel is assembled into the suspension system, thus occupying less space of the chassis of the vehicle as compared to current suspension systems (e.g., trailing arm suspension systems). Furthermore, the disclosed suspension systems may be adapted to provide various camber angles (e.g., either positive or negative constant camber angles) for the wheel and an inclined steering axis (e.g., constant inclined steering axis). Furthermore, the disclosed suspension systems may minimize unintended steering rotation of the suspension assembly and the wheel interface as compared to current suspension systems. Furthermore, some embodiments of the disclosed suspension systems may take advantages of drive-by-wire technology (e.g., steer-by-wire, brake-by-wire, etc.).

In the above description, an embodiment is an example or implementation of the invention. The various appearances of "one embodiment", "an embodiment", "certain embodiments" or "some embodiments" do not necessarily all refer to the same embodiments. Although various features of the invention can be described in the context of a single embodiment, the features can also be provided separately or in any suitable combination. Conversely, although the invention can be described herein in the context of separate embodiments for clarity, the invention can also be implemented in a single embodiment. Certain embodiments of the invention can include features from different embodiments disclosed above, and certain embodiments can incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A suspension system for a wheel of a vehicle, the system comprising:
   a wheel interface having a wheel interface axis which is an axis about which a wheel rotates when connected to the wheel interface;
   a sub-frame to connect at least a portion of the suspension system to a reference frame of the vehicle; and
   a first arm and a second arm connected to the wheel interface and rotatable with respect to the wheel interface about a first axis and a second axis, respectively, which are substantially parallel to the wheel interface axis, wherein the first arm and the second arm are connected to the sub-frame and rotatable with respect to the sub-frame about a third axis and a fourth axis, respectively, which are substantially parallel to the wheel interface axis,
   wherein the first arm and the second arm are rotatable about a steering axis that extends through the first arm; and
   wherein the wheel interface axis is positioned between (i) an axis being perpendicular to and extending between the first axis and the second axis, (ii) an axis being perpendicular to and extending between the third axis and the fourth axis.

2. The suspension system of claim 1, wherein the steering axis is substantially perpendicular to the wheel interface axis.

3. The suspension system of claim 1, wherein the steering axis is inclined with respect to an axis that is perpendicular to the wheel interface axis.

4. The suspension system of claim 1, further comprising a damping and springing means disposed within a gap formed between the first arm and the second arm, the damping and springing means are connected between one of: the first arm and the second arm, one of the first and second arm and the wheel interface, and one of the first and second arms and the sub-frame.

5. The suspension system of claim 4, wherein the damping and springing means has a linear motion axis which is inclined with respect to the steering axis.

6. The suspension system of claim 4, wherein the damping and springing means is connected between the second arm, and one of the wheel interface and the sub-frame.

7. The suspension system of claim 4, wherein at least one of the first arm and the second arm has an arm aperture, and wherein at least a portion of the damping and springing means is movable within the arm aperture thereof.

8. The suspension system of claim 7, wherein the arm aperture is at one of ends of the respective arm.

9. The suspension system of claim 1, wherein the first arm and the second arm are connected to the wheel interface at respective first ends and to the sub-frame at respective second ends.

10. The suspension system of claim 1, wherein the first arm, the second arm and the wheel interface are dimensioned, and positions of the first axis, the second axis, the third axis and the fourth axis are set to form a substantially parallelogram shape of the suspension system.

11. The suspension system of claim 1, wherein the wheel interface is shaped to provide one of a positive camber angle and a negative camber angle.

12. The suspension system of claim 1, wherein at least one of the first arm and the second arm is curved along its longitudinal dimension.

13. The suspension system of claim 1, wherein the third axis and the fourth axis are in front of the wheel interface axis along an axis that is alignable with a vehicle longitudinal axis extending from a rear end towards a front end of a vehicle.

14. The suspension system of claim 1, wherein the first axis and the second axis are in front of the wheel interface axis along an axis that is alignable with a vehicle longitudinal axis extending from a rear end towards a front end of a vehicle.

15. A vehicle comprising two or more suspension systems each according to claim 1.

16. The suspension system of claim 1, wherein the first arm is connected at its first end to the wheel interface and connected at its second end to the sub-frame, and wherein the steering axis extends through the second end of the first arm.

17. The suspension system of claim 1, wherein the steering axis further extends through the second arm.

18. The suspension system of claim 17, wherein the second arm is connected at its first end to the wheel interface and connected at its second end to the sub-frame, and wherein the steering axis extends through the second end of the second arm.

19. The suspension system of claim 1, wherein the first arm and the second arm are positioned within a diameter of a rim of a wheel when the wheel is assembled to the suspension system.

20. The suspension system of claim 1, further comprising a steering arm connected to at least one of the first arm and the second arm, the steering arm is positioned within a diameter of a rim of a wheel when the wheel is assembled to the suspension system.

21. A suspension system for a wheel of a vehicle, the system comprising:
a wheel interface having a wheel interface axis which is an axis about which a wheel rotates when connected to the wheel interface;
a sub-frame to connect at least a portion of the suspension system to a reference frame of the vehicle;
a first arm and a second arm connected to the wheel interface and rotatable with respect to the wheel interface about a first axis and a second axis, respectively, which are substantially parallel to the wheel interface axis, wherein the first arm and the second arm are connected to the sub-frame and rotatable with respect to the sub-frame about a third axis and a fourth axis, respectively, which are substantially parallel to the wheel interface axis,
wherein the first arm and the second arm are rotatable about a steering axis that extends through the first arm and the second arm; and
wherein the wheel interface axis is positioned between (i) an axis being perpendicular to and extending between the first axis and the second axis, (ii) an axis being perpendicular to and extending between the third axis and the fourth axis.

22. The suspension system of claim 21, wherein the first arm and the second arm are connected at respective first ends to the wheel interface and connected at respective second ends to the sub-frame, and wherein the steering axis extends through the second ends of the first arm and the second arm.

23. The suspension system of claim 21, wherein the first arm and the second arm are positioned within a diameter of a rim of a wheel when the wheel is assembled to the suspension system.

24. The suspension system of claim 21, further comprising a steering arm connected to at least one of the first arm and the second arm, the steering arm is positioned within a diameter of a rim of a wheel when the wheel is assembled to the suspension system.

* * * * *